(12) United States Patent
Ke

(10) Patent No.: US 12,231,883 B2
(45) Date of Patent: Feb. 18, 2025

(54) NETWORK ACCESS METHOD, TERMINAL, AND NETWORK SIDE NETWORK ELEMENT

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 980 days.

(21) Appl. No.: 17/128,457

(22) Filed: Dec. 21, 2020

(65) Prior Publication Data

US 2021/0112412 A1    Apr. 15, 2021

Related U.S. Application Data

(63) Continuation of application No. PCT/CN2019/092274, filed on Jun. 21, 2019.

(30) Foreign Application Priority Data

Jun. 22, 2018 (CN) .......................... 201810654746.2

(51) Int. Cl.
*H04W 12/069* (2021.01)
*H04W 48/02* (2009.01)
(Continued)

(52) U.S. Cl.
CPC .......... *H04W 12/069* (2021.01); *H04W 48/02* (2013.01); *H04W 60/04* (2013.01); *H04W 76/11* (2018.02); *H04W 84/042* (2013.01)

(58) Field of Classification Search
CPC ... H04W 12/069; H04W 48/02; H04W 60/04; H04W 76/11; H04W 84/042; H04W 8/20;
(Continued)

(56) References Cited

U.S. PATENT DOCUMENTS 6,061,346 A * 5/2000 Nordman ................ H04L 63/08
370/352
6,081,900 A * 6/2000 Subramaniam ..... H04L 63/0807
713/153
(Continued)

FOREIGN PATENT DOCUMENTS

CN    107820292 A    3/2018
CN    108024314 A    5/2018
(Continued)

OTHER PUBLICATIONS

Partial Supplementary European Search Report dated Jul. 2, 2021 issued in PCT/CN2019/092274.
(Continued)

*Primary Examiner* — Matthew Smithers
(74) *Attorney, Agent, or Firm* — BROOKS KUSHMAN P.C.

(57) ABSTRACT

Provided are a network access method, a terminal, and a network side network element. The network access method comprises: obtaining non-public communication network related certificate information; according to the non-public communication network related certificate information, executing an operation of accessing a first network, the first network being a network supporting a non-public communication service.

20 Claims, 6 Drawing Sheets

---

Obtain certificate information related to a non-public communication network — 101

Perform an operation of accessing a first network based on the certificate information related to the non-public communication network, where the first network is a network supporting a non-public communication service — 102

(51) Int. Cl.
*H04W 60/04* (2009.01)
*H04W 76/11* (2018.01)
*H04W 84/04* (2009.01)

(58) Field of Classification Search
CPC ... H04W 12/08; H04W 48/16; H04W 60/005; H04W 88/06; H04W 12/06; H04L 63/0823
See application file for complete search history.

(56) References Cited

U.S. PATENT DOCUMENTS

| | | | | |
|---|---|---|---|---|
| 6,976,177 | B2* | 12/2005 | Ahonen | H04L 63/0272 |
| | | | | 713/153 |
| 7,448,080 | B2* | 11/2008 | Karjala | H04L 63/105 |
| | | | | 455/410 |
| 8,150,002 | B2* | 4/2012 | Gilchrist | H04L 65/1079 |
| | | | | 379/88.19 |
| 8,549,280 | B2* | 10/2013 | Dagg | H04L 51/00 |
| | | | | 713/168 |
| 8,977,856 | B2* | 3/2015 | Malek | H04W 12/04 |
| | | | | 713/171 |
| 9,060,329 | B2* | 6/2015 | Montemurro | H04W 4/06 |
| 9,203,627 | B2* | 12/2015 | Edstrom | H04L 63/0884 |
| 9,942,200 | B1* | 4/2018 | Tan | H04L 63/0281 |
| 10,148,655 | B2* | 12/2018 | Shah | H04L 65/1016 |
| 10,306,433 | B1* | 5/2019 | Indurkar | H04M 1/72406 |
| 10,602,365 | B2* | 3/2020 | Lee | H04W 84/10 |
| 10,855,674 | B1* | 12/2020 | Geusz | H04L 63/20 |
| 11,190,504 | B1* | 11/2021 | Ah Kun | H04L 9/3247 |
| 2004/0093492 | A1* | 5/2004 | Daude | H04L 63/0823 |
| | | | | 726/15 |
| 2004/0158716 | A1* | 8/2004 | Turtiainen | H04L 63/06 |
| | | | | 713/172 |
| 2009/0043891 | A1* | 2/2009 | Woo | H04L 12/66 |
| | | | | 709/225 |
| 2009/0086971 | A1* | 4/2009 | Grayson | H04L 63/0485 |
| | | | | 380/258 |
| 2009/0222902 | A1* | 9/2009 | Bender | H04L 63/0823 |
| | | | | 726/10 |
| 2011/0213961 | A1* | 9/2011 | Wnuk | H04L 63/062 |
| | | | | 713/156 |
| 2013/0013923 | A1* | 1/2013 | Thomas | H04W 12/06 |
| | | | | 713/168 |
| 2014/0109177 | A1* | 4/2014 | Barton | H04L 67/34 |
| | | | | 726/1 |
| 2014/0201812 | A1* | 7/2014 | Tarrago | G06Q 10/10 |
| | | | | 726/3 |
| 2016/0226869 | A1* | 8/2016 | Vachiravel | H04L 63/10 |
| 2016/0277927 | A1* | 9/2016 | Lee | H04L 67/51 |
| 2016/0277940 | A1* | 9/2016 | Waylett | H04W 88/10 |
| 2016/0337953 | A1 | 11/2016 | Ji et al. | |
| 2017/0104748 | A1* | 4/2017 | Koster | H04L 9/3268 |
| 2017/0126664 | A1* | 5/2017 | Khandelwal | H04L 63/0823 |
| 2017/0339609 | A1 | 11/2017 | Youn et al. | |
| 2018/0167812 | A1 | 6/2018 | Nagarajamoorthy et al. | |
| 2019/0261264 | A1 | 8/2019 | Lou et al. | |

FOREIGN PATENT DOCUMENTS

| | | |
|---|---|---|
| CN | 105610667 B | 1/2019 |
| WO | 2004112345 A1 | 12/2004 |
| WO | 2015113263 A1 | 8/2015 |
| WO | 2018069852 A1 | 4/2018 |

OTHER PUBLICATIONS

3GPP TSG SA WG3 (Security) Meeting #84b; S3-161365; Jul. 25-29, 2016 San Diego (USA); "Alternative 3GPP Credentials based on Identity-based Cryptography"; 2 pages.
3GPP TSG-SA WG1 Meeting #82; S1-181444; Dubrovnik, Croatia, May 7-11, 2018; "FS_CAV—section 8.2.1—network service access requirements"; 5 pages.
3GPP TSG-SA WG1 Meeting #82; S1-181650; Dubrovnik, Croatia, May 7-11, 2018; "Way forward"; 8 pages.
First Office Action dated May 8, 2020 issued in Chinese Application No. 201810654746.2.
International Preliminary Report on Patentability dated Dec. 30, 2020 issued in PCT/CN2019/092274.
Second Office Action dated Apr. 1, 2021 issued in Chinese Application No. 201810654746.2.
Third Office Action for European Application No. 19 823 386.8-1216, dated Jun. 16, 2023, 9 Pages.

* cited by examiner

NETWORK ACCESS METHOD, TERMINAL, AND NETWORK SIDE NETWORK ELEMENT

CROSS REFERENCE TO RELATED APPLICATIONS

This application is continuation application of PCT International Application No. PCT/CN2019/092274 filed on Jun. 21, 2019, which claims priority to Chinese Patent Application No. 201810654746.2 filed on Jun. 22, 2018 in China, the disclosures of which are incorporated in their entireties by reference herein.

TECHNICAL FIELD

The present disclosure relates to the field of communications technologies, and in particular, to a network access method, a terminal, and a network side network element.

BACKGROUND

In related technologies, many vertical industries such as railway scheduling and automatic control all have demand for communication. A communication network using the fifth-generation mobile communications technology (5th-Generation, 5G) can provide a private communication service of a local area network (Local Area Network, LAN) type for vertical industries, to meet the demand of communication in vertical industries. A service of the LAN type may be a private communication service of an IP type or a non-IP type provided in a network system of the 3rd Generation Partnership Project (3rd Generation Partnership Project, 3GPP).

A private virtual network (Private Virtual Network, PVN) may be a private virtual network that supports the service of the LAN type. Concepts of the PVN and the LAN may be used interchangeably, and may refer to a non-public communication network or a non-public communication service in a broad sense.

The non-public communication network may include a network of a type A and a network of a type B. The network of the type A may be a communication network (for example, the communication network is a 3GPP network) that is not used for the public, but the network and an operator network can implement service continuity or roaming. The network of the type B may be an isolated communication network (for example, the communication network is a 3GPP network) that does not interact with an operator network (for example, a public land mobile network (Public Land Mobile Network, PLMN)).

The non-public communication network, as a transmission network of a non-public network of a vertical industry, can support a terminal in a non-public network to perform a service in the non-public network or implement communication between terminals in a non-public network.

When the non-public communication network is provided for a vertical service through an operator network, terminals of the vertical service may access the non-public communication network to communicate with each other or access a server of the vertical service. A terminal in the vertical industry may further simultaneously access a public operator network for a public communication service. However, in related technologies, it is unclear how the terminal accesses each of a non-public communication network and a public communication network.

SUMMARY

Embodiments of the present disclosure provide a network access method, a terminal, and a network side network element, to clarify how a terminal accesses each of a non-public communication network and a public communication network.

According to a first aspect, an embodiment of the present disclosure provides a network access method, applied to a communications device, and including:
obtaining certificate information related to a non-public communication network; and
performing an operation of accessing a first network based on the certificate information related to the non-public communication network, where the first network is a network supporting a non-public communication service.

According to a second aspect, an embodiment of the present disclosure provides a network access method, applied to a terminal side, and including:
determining whether a preset condition is met; and
when determining that the preset condition is met, sending first information to a target end, where
the first information includes at least one of the following: access network type information, information of non-public communication network, indication information of non-public communication service, and DN container information related to a non-public communication service.

According to a third aspect, an embodiment of the present disclosure provides a network access method, applied to a network side, and including:
obtaining first information; and
determining a registration operation based on the first information, where
the first information includes at least one of the following: access network type information, information of non-public communication network, indication information of non-public communication service, and DN container information related to a non-public communication service.

According to a fourth aspect, an embodiment of the present disclosure provides a communications device, including:
a first obtaining module, configured to obtain certificate information related to a non-public communication network; and
an execution module, configured to perform an operation of accessing a first network based on the certificate information related to the non-public communication network, where
the first network is a network supporting a non-public communication service.

According to a fifth aspect, an embodiment of the present disclosure provides a terminal, including:
a determining module, configured to determine whether a preset condition is met; and
a sending module, configured to: when determining that the preset condition is met, send first information to a target end, where
the first information includes at least one of the following: access network type information, information of non-public communication network, indication information of non-public communication service, and DN container information related to a non-public communication service.

According to a sixth aspect, an embodiment of the present disclosure provides a network side network element, including:
- a second obtaining module, configured to obtain first information; and
- a determining module, configured to determine a registration operation based on the first information, where the first information includes at least one of the following: access network type information, information of non-public communication network, indication information of non-public communication service, and DN container information related to a non-public communication service.

According to a seventh aspect, an embodiment of the present disclosure provides a communications device, including: a memory, a processor, and a computer program stored in the memory and executable on the processor. When the computer program is executed by the processor, the steps of the foregoing network access method may be performed.

According to an eighth aspect, an embodiment of the present disclosure provides a computer-readable storage medium. The computer-readable storage medium stores a computer program, and when the computer program is executed by a processor, the steps of the foregoing network access methods may be performed.

In the embodiments of the present disclosure, the certificate information related to the non-public communication network is configured on each of the terminal side and network side, and the terminal can access a network supporting the non-public communication service, to clarify how the terminal accesses each of the non-public communication network and the public communication network. In this way, the terminal securely accesses a service in a non-public network through the non-public communication network or terminals in the non-public network communicate with each other. Alternatively, the first information may be used to help a network know that the non-public communication network is currently accessed, to clarify how the terminal accesses each of the non-public communication network and the public communication network.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other accompanying drawings from these accompanying drawings without creative efforts.

DESCRIPTION OF EMBODIMENTS

Figure 1:
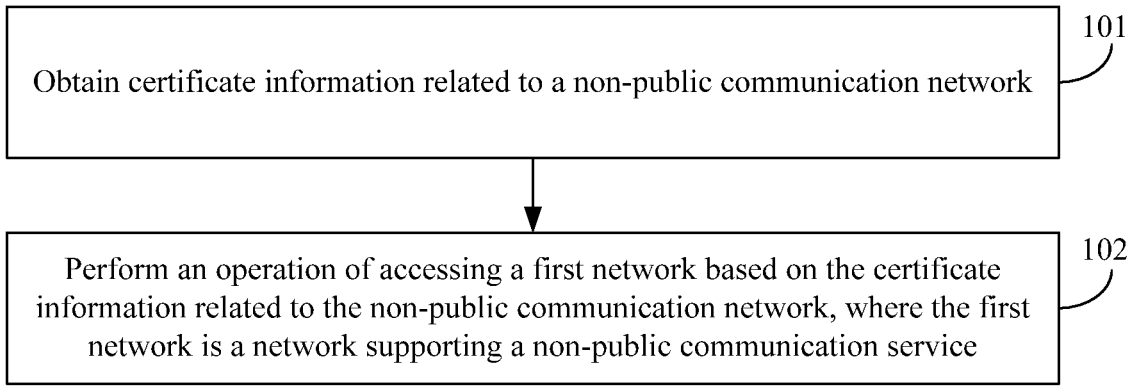
FIG. 1 is a flowchart of a network access method according to an embodiment of the present disclosure.

It should be first noted that a terminal of a non-public communication network may be registered with both the non-public communication network and a public communication network, to use both a non-public communication service and a public communication service. For example, a terminal in a network of a type B may be registered twice: registered with the network of the type B for the first time and registered with an operator PLMN network for the second time.

For registration with both the non-public communication network and the public communication network, the following problems need to be resolved:

(1) The Issue of Independence of Certificates

Certificates of access to the non-public communication network and the public communication network need to be distinguished from each other. What should be included in the certificate associated with the non-public communication network is unclear:
1) It is unclear whether a dedicated user identifier exists.
2) It is unclear whether an independent key is required.
3) Certificate validity time.
4) Certificate validity area.
5) The terminal may include applications of both public communication and non-public communication, but the terminal still lacks information to determine applications that should trigger non-access stratum (Non-access stratum, NAS) signaling related to the public communication and applications that should trigger NAS signaling related to the non-public communication.
6) Whether an application of the non-public communication network needs to be configured on a universal integrated circuit card (Universal Integrated Circuit Card, UICC).

(2) Registration Verification and a Registration Network Element.

The terminal of the network of the type B may require verification by a data network (Data Network, DN) of a vertical service, to be registered with the network of the type B.

When the terminal is registered with both the non-public communication network and the public communication network, it is unclear whether the terminal is registered with a same core network network element or each of two core network network elements (for example, a same AMF entity or two AMF entities and a same UDM or two UDMs). When the core network network element is a dedicated network element in the non-public communication network, dual registration of the terminal should be registration with the two core network network elements. When a mobile management anchor is a common network element of the non-public communication network and the public communication network, the dual registration of the terminal may be registration with a same core network network element.

Generally, a terminal of one operator has only one user identifier. The non-public communication network is a non-public virtual network in an operator network. The terminal may request to register with each of the non-public communication network and the public communication network by using the same user identifier (for example, an SUPI). When a first registration context of the terminal already exists, if the network receives a second registration request from the terminal, the network is unclear whether to replace existing registration or whether the terminal requests to be registered with a different type of network and a second registration context needs to be established for the terminal.

(3) Subscription Data

Subscription data of the terminal may include subscription data related to a non-public communication service or subscription data related to a public communication service, but a network is unclear whether the subscription data related to the non-public communication service or the subscription data related to the public communication service is used to verify a current registration request for the terminal.

(4) The Issue of a Registration Type.

The terminal in the network of the type A may be allowed to roam in the non-public communication network and the public communication network. However, a corresponding radio access network (Radio Access Network, RAN) may support only the non-public communication network, support only the public communication network, or support both the non-public communication network and the public communication network.

When the terminal initiates registration, the RAN does not know a registration network type or a registration network identifier of the terminal.

If a currently accessed RAN supports only the non-public communication network, registration of the terminal of the type A is registration with the non-public communication network.

If a currently accessed RAN supports only the public communication network, registration of the terminal of the type A is registration with the public communication network. It is assumed that the terminal is currently a roaming terminal:

If the non-public communication network and the public communication network are a same PLMN, the network cannot directly determine, based on the SUPI, that the terminal is a roaming terminal.

If subscription information of the terminal (information (an identifier and an area) of the subscribed non-public communication network) indicates that the terminal is a terminal of the non-public communication network and a current RAN network element is not in a service area of the non-public communication network, an AMF entity needs to select a V-PCF (Visited PCF) and an H-PCF (Home PCF) (in the non-public communication network) to register for public communication.

If a currently accessed RAN supports both the non-public communication network and the public communication network, a network type of registration of the terminal in the network of the type A cannot be determined. The terminal needs to know whether current successful registration is for the public communication or the non-public communication. When it is non-public communication, non-public communication service data may be sent. When it is public communication, non-public communication service data and public communication service data may be sent.

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a core network network element (CN (Core Network) network element) may include, but is not limited to, at least one of the following: a core network device, a core network node, a core network function, a core network network element, a mobile management entity (Mobility Management Entity, MME), an access management function (Access Management Function, AMF), a session management function (Session Management Function, SMF), a user plane function (User Plane Function, UPF), a serving gateway (serving GW, SGW), a PDN gateway (PDN GateWay, PDN gateway), a policy control function (Policy Control Function, PCF), a policy and charging rules function (Policy and Charging Rules Function, PCRF), a serving GPRS support node (Serving GPRS Support Node, SGSN), a gateway GPRS support node (Gateway GPRS Support Node, GGSN), and a radio access network device.

In the embodiments of the present disclosure, a radio access network network element (RAN network element) may include, but is not limited to, at least one of the following: a radio access network device, a radio access network node, a radio access network function, a radio access network unit, a 3GPP radio access network, a non-3GPP radio access network, a centralized unit (Centralized Unit, CU), a distributed unit (Distributed Unit, DU), a base station, an evolved NodeB (evolved NodeB, eNB), a 5G base station (gNB), a radio network controller (Radio Network Controller, RNC), a NodeB (NodeB), a non-3GPP Inter Working Function (Non-3GPP Inter Working Function, N3IWF), an access controller (Access Controller, AC) Node, an access point (Access Point, AP) device, or a wireless local area network (Wireless Local Area Networks, WLAN) node.

Abase station may be a base transceiver station (Base Transceiver Station, BTS) in GSM or CDMA, a NodeB (NodeB) in WCDMA, an evolved NodeB in LTE (eNB or e-NodeB, evolutional Node B), and a gNB (gNB) in 5G This is not limited in the embodiments of the present disclosure.

In the embodiments of the present disclosure, a non-public communication network may include or may be referred to as a private communication network. A non-public communication network may also be referred to as a private virtual network (PVN), an isolated communication network, a dedicated communication network, a local area network (Local area network), or other names. It should be noted that a naming method is not specifically limited in the embodiments of the present disclosure.

In the embodiments of the present disclosure, application information may also be referred to as a flow descriptor or flow description information.

In the embodiments of the present disclosure, a network side network element may include at least one of the following: a CN network element and a RAN network element.

As shown in FIG. 1, an embodiment of the present disclosure provides a network access method, applied to a communications device. The communications device may be a terminal or a network side network element. The method includes the following steps:

Step 101: Obtain certificate information related to a non-public communication network.

Optionally, the network side network element may include at least one of the following: a unified data management (Unified Data Management, UDM) entity and a unified data repository (Unified Data Repository, UDR).

In the embodiments of the present disclosure, obtaining in step 101 may be understood as obtaining based on a configuration, obtaining through reception, obtaining through reception after requesting, or obtaining after processing based on received information. Details may be determined based on actual needs. This is not limited in the embodiments of the present disclosure.

In an implementation, a terminal supporting a non-public communication service may obtain a certificate of the non-public communication service based on a configuration. After the terminal is subsequently registered with a non-public communication network, an updated certificate related to the non-public communication service may be obtained from the network.

In an implementation, the certificate information related to the non-public communication network may be certificate information specific to the non-public communication network.

In an implementation, the certificate information related to the non-public communication network may also be referred to as certificate information related to a non-public communication service. The certificate information related to the non-public communication service may be certificate information specific to the non-public communication service.

Optionally, the certificate information related to the non-public communication network may include at least one of the following:

a dedicated user identifier, dedicated security information, certificate validity time information, certificate validity area range information, information of non-public communication network, information of non-public communication service application, and dedicated access control information.

Further, the dedicated user identifier may refer to a user identifier specific to the non-public communication network. The dedicated user identifier may include any of the following: a subscription permanent identifier (Subscription Permanent Identifier, SUPI) and a user identifier in a non-public DN. In an implementation, the dedicated user identifier may include an identifier of the non-public communication network. It is not difficult to understand that when the dedicated user identifier is used, it may indicate that the terminal may have two user identifiers. One user identifier is used for the non-public communication network and the other user identifier is used for the public communication network.

Further, the dedicated security information may refer to security information specific to the non-public communication network. The dedicated security information may include any of the following: key information (for example, a KAMF) and a security key in a non-public DN.

Further, the certificate validity time information may include any one of the following: a valid start time and a valid end time. It is not difficult to understand that for some temporary users, the certificate information related to the non-public communication network on the terminal may be controlled by using the certificate validity time information.

Further, the certificate validity area range information may include any one of the following: a tracking area (Tracking Area, TA) identifier, a radio access network (Radio Access Network, RAN) network element identifier, and a cell identifier. It is not difficult to understand that when the terminal moves out of a service area range of the non-public communication network, but initiates registration of the non-public communication service in the public communication network, even if an authentication network element verifies that other information of the certificate is correct, a corresponding registration request should be rejected. In some implementations, a certificate validity area range may be a service area range of a configured non-public communication network.

Further, the information of non-public communication network may include any one of the following: a non-public communication network identifier, non-public communication network type information, a PLMN identifier of the non-public communication network, service area information of the non-public communication network, and information of non-public communication network application. Further, the non-public communication network type may include at least one of the following: a type A and a type B.

In an implementation, only a terminal of the type B has a certificate related to a private communication service. In an implementation, for a same vertical service data network (DN), non-public communication networks may be deployed in different PLMNs, and the terminal can access the vertical service DN through all the non-public communication networks of the different PLMNs. Non-public communication network identifiers for a same non-public communication network or a same non-public communication network group may be different in different PLMNs. For example, <PLMN1, a non-public communication network identifier A> and <PLMN2, a non-public communication network identifier B> may indicate that there is a mapping relationship between <PLMN1, a non-public communication network identifier A> and <PLMN2, a non-public communication network identifier B> for a same non-public communication network or a same non-public communication network group. In another implementation, the non-public communication network identifier may include a PLMN identifier and may uniquely identify the non-public communication network globally. It is not difficult to understand that the non-public communication network corresponding to the certificate can be known through an identifier of the non-public communication network. A plurality of non-public communication networks may be configured for one terminal. The terminal can select a non-public communication network from the configured non-public communication networks, and access the non-public communication network.

Further, the information of non-public communication service application may include at least one of the following: an application identifier, an IP triple, an IP quintuple, a destination IP address, a destination IPv6 prefix, a source IP address, a source IPv6 prefix, a source port number, a target port number, a protocol identifier, a source media access control (MAC) address, and a destination MAC address Ethernet identifier.

A plurality of applications of the non-public communication service may be configured for one terminal. When these applications generate data, the terminal can select a non-public communication network from the configured non-public communication networks, and access the non-public communication network.

Further, by limiting access control information of the terminal, it may be identified that the terminal is a type of the non-public communication network when the network bars (barring) access by the terminal, and it is determined whether to allow the terminal to access. The access control information includes at least one of the following: an access identifier (Access Identity) and an access category (Access Category).

In an implementation, a server in the non-public communication network may send the certificate information related to the non-public communication network to each of the terminal and the communications network, or configure the certificate information related to the non-public communication network for each of the terminal and the communications network.

Step 102: Perform an operation of accessing a first network based on the certificate information related to the non-public communication network, where the first network is a network supporting the non-public communication service.

The network supporting the non-public communication service may be either a public communication network or a non-public communication network.

It is not difficult to understand that in this embodiment, the certificate information related to the non-public communication network is configured on each of the terminal side and the network side, and the terminal can access the network supporting the non-public communication service, to clarify how the terminal accesses each of the non-public communication network and the public communication network. In this way, the terminal securely accesses a service in the non-public network through the non-public communication network or terminals in the non-public network communicate with each other.

Figure 2:
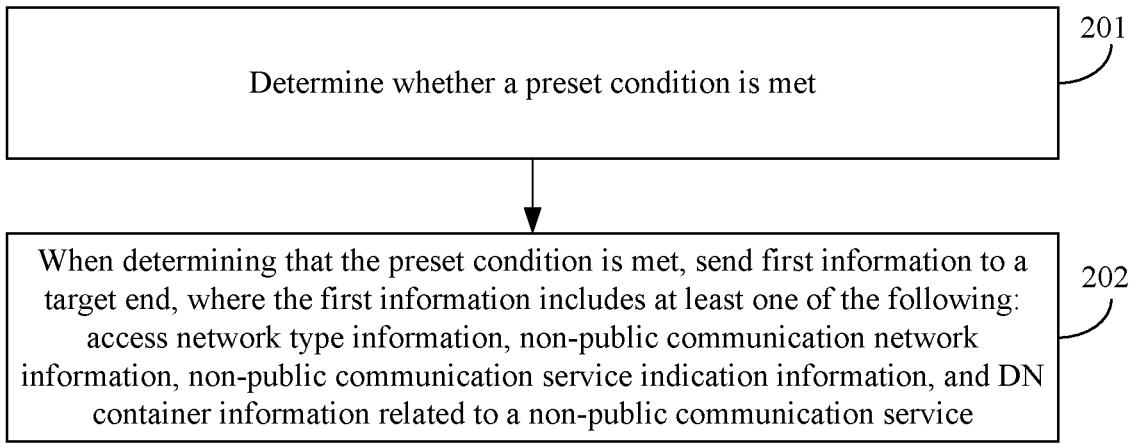
FIG. 2 is a flowchart of another network access method according to an embodiment of the present disclosure.

As shown in FIG. 2, an embodiment of the present disclosure further provides a network access method, applied to a transmit side. The method includes the following steps:

Step 201: Determine whether a preset condition is met.

The preset condition may include any one of the following: accessing a non-public communication network is needed, there is currently non-public communication network's coverage, and a camped cell that indicates that a non-public communication network is supported.

Step 202: When determining that the preset condition is met, send first information to a target end, where the first information includes at least one of the following: access network type information, information of non-public communication network, indication information of non-public communication service, and DN container information related to a non-public communication service.

The target end in step 202 may include at least one of the following: a core network, a radio access network, and an AMF entity.

Further, the access network type information may include any one of the following: information of non-public communication network and information of public communication network. It is not difficult to understand that when a terminal is registered with each of a non-public communication network and a public communication network by using a user identifier, an access network type needs to be indicated. Otherwise, when the network already has a first registration context of the terminal, if the network receives a second registration request of the terminal, the network is unclear whether the terminal requests to be registered with a different type of network and a second registration context needs to be established for the terminal. In an implementation, generally, registration with the public communication network is performed by default. Registration with the non-public communication network is performed only when access to the non-public communication network is instructed.

It is not difficult to understand that the first information in the embodiments of the present disclosure can help the network know that the non-public communication network is currently accessed, thereby clarifying how the terminal accesses each of the non-public communication network and the public communication network. Otherwise, when the terminal is already registered with the public communication network, it is considered that there is an error if the network receives a registration request of a same user identifier again.

Further, the DN container information may be information transmitted between the terminal and the DN by transparently transmitting a container through a communication network. In an implementation, when the terminal accesses the non-public communication network, in addition to verification of the non-public communication network, DN verification may also be required to access the non-public communication network such as a network of a type B. By using the DN container information, the terminal can transmit information required for DN verification.

Figure 3:
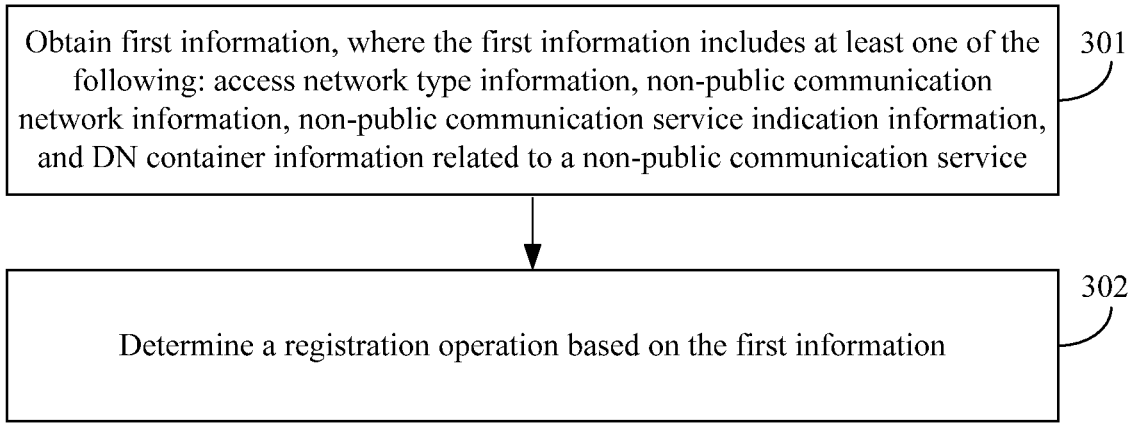
FIG. 3 is a flowchart of another network access method according to an embodiment of the present disclosure.

As shown in FIG. 3, an embodiment of the present disclosure further provides a network access method, applied to a network side network element. The method includes the following steps.

Step 301: Obtain first information, where the first information includes at least one of the following: access network type information, information of non-public communication network, indication information of non-public communication service, and DN container information related to a non-public communication service.

The network side network element may include any one of the following: an AMF entity and a UDM entity.

Optionally, the network side network element may obtain the first information from one of the following: a terminal or terminal subscription data in a UDM entity. The first information may be described in the embodiment shown in FIG. 2.

Step 302: Determine a registration operation based on the first information, where the registration operation may include any one of the following: whether to accept a registration request of a terminal, whether to establish a second context of the terminal, whether to replace a first context of the terminal, verifying the registration request by using subscription data corresponding to network type, sending second information, and whether to request a DN to verify the terminal.

Optionally, the registration request of the terminal may include any one of the following: a registration request sent by the terminal and a registration request of the terminal that is sent by an AMF entity.

In an implementation, when the terminal is already registered for the first time and the first context of the terminal has been stored on the network side, the current registration request of the terminal is a second registration request. Based on the first information, the network side network element may determine that a network type of the second registration request is different from a network type of the first registration, and may perform registration for the second time and establish the second context. Otherwise, based on the first information, the network side network element may determine that the network type of the second registration request is the same as the network type of the first registration and the first context may be replaced. In an implementation, when the first information is not obtained, this indicates that registration with the public communication network is performed by default. When the first information is obtained, this indicates that registration with the non-public communication network is performed.

In an implementation, when the network side network element is an AMF entity, further, the first information may be sent to the UDM entity when the AMF entity determines to perform registration for the second time. The UDM entity determines the registration operation according to the received first information.

Further, the second information may include any one of the following: type information of the registration accept and information of network accepting the registration. The registration acceptance type may include any one of the following: non-public communication network registration and public communication network registration. The information of network accepting the registration may include: a registration acceptance network identifier.

It is not difficult to understand that the first information in the embodiments of the present disclosure can help the network know that the non-public communication network is currently accessed.

Some specific embodiments of the present disclosure are described in detail below with reference to FIG. 4 to FIG. 7.

Figure 4:
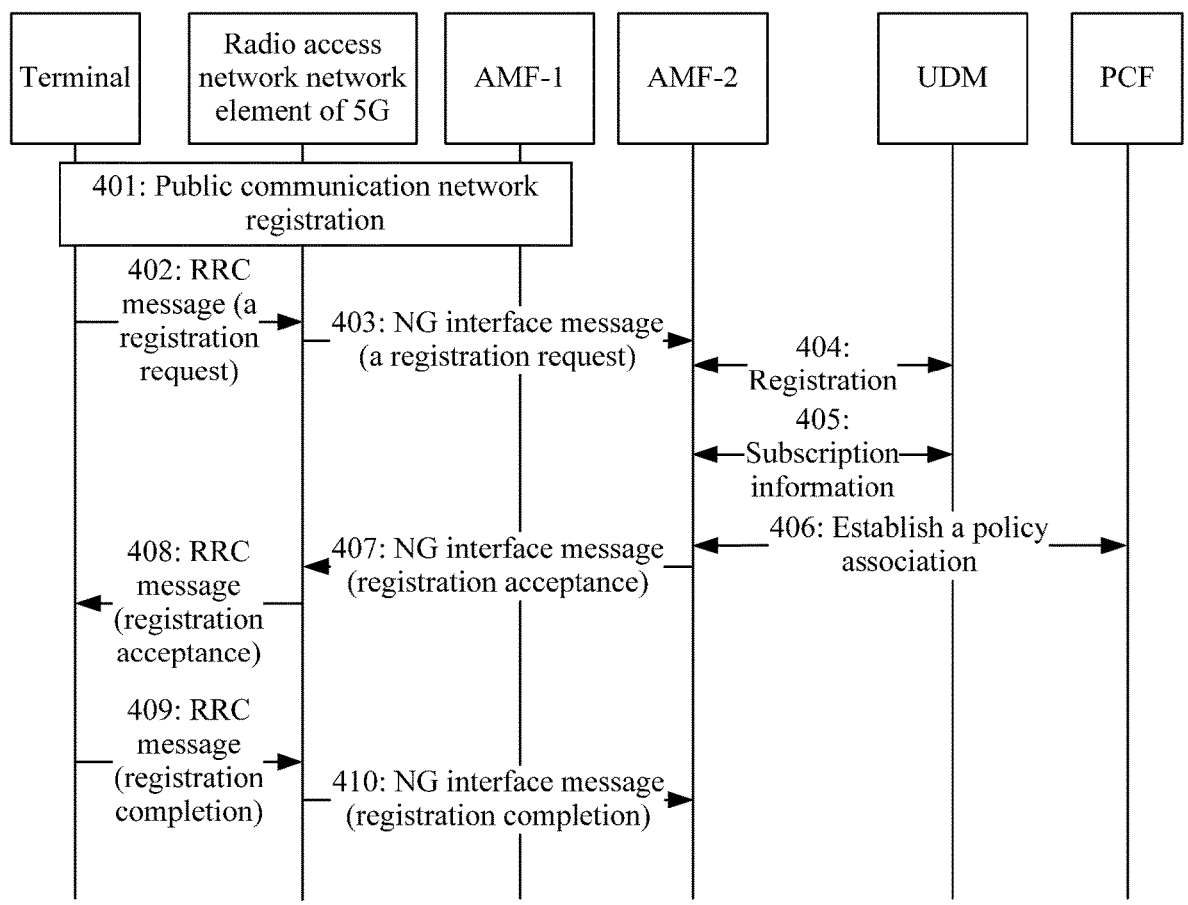
FIG. 4 is a flowchart 1 of a registration process according to an embodiment of the present disclosure.

As shown in FIG. 4, when a terminal is already registered with a public communication network, the terminal may initiate a process of registering with a non-public communication network (for example, registering with a corresponding network of a type B, where an AMF entity of the public communication network and an AMF entity of the non-public communication network in an architecture 1 shown in FIG. 4 are independent of each other). The non-public communication network may be a non-public virtual network in a public communication network PLMN. As shown in FIG. 4, the registration process may include the following steps:

Step 401: A terminal registers a public communication network service with an AMF-1 entity through a radio access network network element of 5G.

Step 402: The terminal sends a radio resource control (Radio Resource Control, RRC) message to the radio access network network element of 5G, where the RRC message includes a registration request message related to a non-public communication network.

Optionally, the registration request message may include first information. This first information may be described in the embodiment shown in FIG. 2. For example, the first information may include at least one of the following: access network type information, information of non-public communication network, indication information of non-public communication service, and data network DN container information related to a non-public communication service.

Optionally, the first information may be included in the RRC message. The radio access network network element of 5G may select an AMF-2 entity based on the first information.

Optionally, the RRC message does not include any one of the following: a temporary identifier of the terminal (5G-GUTI (5G Globally Unique Temporary UE Identity) or 5G-S-TMSI (5G S (System Architecture Evolved)-Temporary Mobile Subscriber Identity)) and an identifier of the AMF-1 entity (GUAMI (Globally Unique AMF ID)). Because the radio access network network element of 5G has established a connection with the AMF-1 entity for the terminal, the radio access network network element of 5G may select the AMF-1 entity if these pieces of information are included.

Step 403: The radio access network network element of 5G sends an NG interface message to the AMF-2 entity, where the NG interface message includes a registration request message.

Optionally, the registration request message may include the first information. According to the first information, the AMF-2 entity may determine that the terminal is registered with the non-public communication network.

Step 404: The AMF-2 entity performs registration with a UDM.

Optionally, the AMF-2 entity may send the first information to the UDM. According to the first information, the UDM may determine that the terminal is registered with the non-public communication network. The UDM does not delete a context that is previously registered by the terminal with the public communication network.

Step 405: The AMF-2 entity obtains subscription information of the terminal from the UDM.

Optionally, the UDM may send the subscription information of the non-public communication network of the terminal to the AMF-2 entity.

Step 406: Optionally, the AMF-2 entity establishes a policy association with a packet control function (Packet Control Function, PCF) entity for the terminal.

Step 407: The AMF-2 entity sends an NG interface message to the radio access network network element of 5G, where the NG interface message may include a registration acceptance message.

Step 408: The radio access network network element of 5G sends an RRC message to the terminal, where the RRC message may include the registration acceptance message.

Optionally, second information may be indicated by the RRC message. The second information may be described in the embodiment shown in FIG. 3. For example, the second information may include any one of the following: type information of the registration accept and information of network accepting the registration.

Step 409: The terminal sends an RRC message to the radio access network network element of 5G, where the RRC message may include a registration completion message related to the non-public communication network.

Step 410: The radio access network network element of 5G sends an NG interface message to the AMF-2 entity, where the NG interface message may include the registration complete message.

Optionally, after registration is completed, the AMF-1 entity and the AMF-2 entity may separately store the registration context of the terminal. The terminal stores two sets of registration contexts. The radio access network network element of 5G can maintain two RRC connections or one RRC connection, depending on an establishment manner of the terminal.

Figure 5:
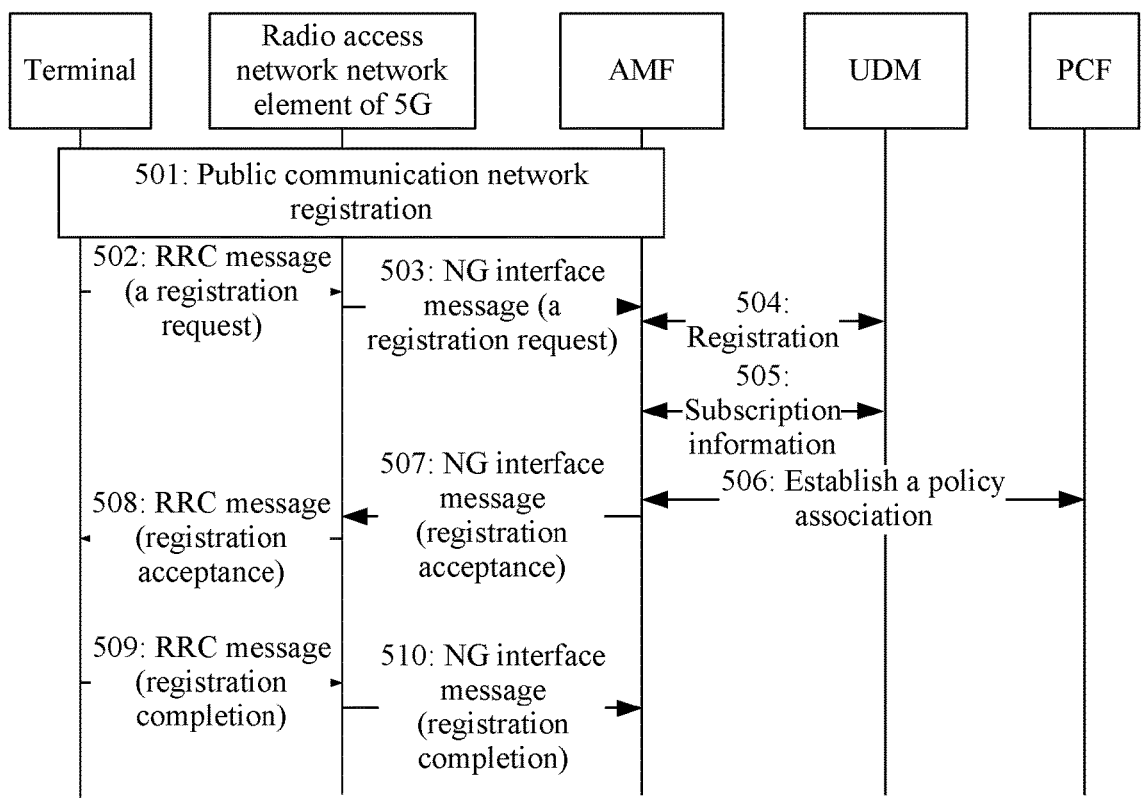
FIG. 5 is a flowchart 2 of a registration process according to an embodiment of the present disclosure.

As shown in FIG. 5, when a terminal is already registered with a public communication network, the terminal may initiate a process of registering with a non-public communication network (for example, a registration network corresponding to the type B, where an AMF entity in an architecture 2 shown in FIG. 4 is shared by a public communication network and a non-public communication network). The non-public communication network may be a non-public virtual network in a public communication network PLMN. As shown in FIG. 5, the registration process may include the following steps:

Step 501: A terminal registers a public communication network service with an AMF entity through a radio access network network element of 5G.

Step 502: The terminal sends an RRC message to the radio access network network element of 5G where the RRC message includes a registration request message related to the non-public communication network.

Optionally, the registration request message may include first information. The first information may be described in the embodiment shown in FIG. 2. For example, the first information may include at least one of the following: access network type information, information of non-public communication network, indication information of non-public communication service, and data network DN container information related to a non-public communication service.

Step 503: The radio access network network element of 5G sends an NG interface message to the AMF entity, where the NG interface message includes a registration request message.

Optionally, the registration request message may include the first information. The first information may be described in the embodiment shown in FIG. 2. According to the first information, the AMF entity may determine that the terminal is registered with the non-public communication network. The AMF entity does not delete a context that is previously registered.

Step 504: The AMF entity performs registration with a UDM.

Optionally, the AMF entity may send the first information to the UDM. According to the first information, the UDM may determine that the terminal is registered with the non-public communication network. The UDM does not delete the context that is previously registered by the terminal with the public communication network.

Step 505: The AMF entity obtains subscription information of the non-public communication network of the terminal from the UDM.

Optionally, the UDM may send the subscription information of the non-public communication network of the terminal to the AMF entity.

Step 506: Optionally, the AMF entity establishes a policy association with the PCF entity for the terminal.

Step 507: The AMF entity sends an NG interface message to the radio access network network element of 5G, where the NG interface message may include a registration acceptance message.

Step 508: The radio access network network element of 5G sends an RRC message to the terminal, where the RRC message may include the registration acceptance message.

Step 509: The terminal sends an RRC message to the radio access network network element of 5G, where the RRC message may include a registration completion message related to the non-public communication network.

Step 510: The radio access network network element of 5G sends an NG interface message to the AMF entity, where the NG interface message may include the registration completion message.

Optionally, after registration is completed, the AMF entity and the terminal may separately store two sets of registration contexts.

Figure 6:
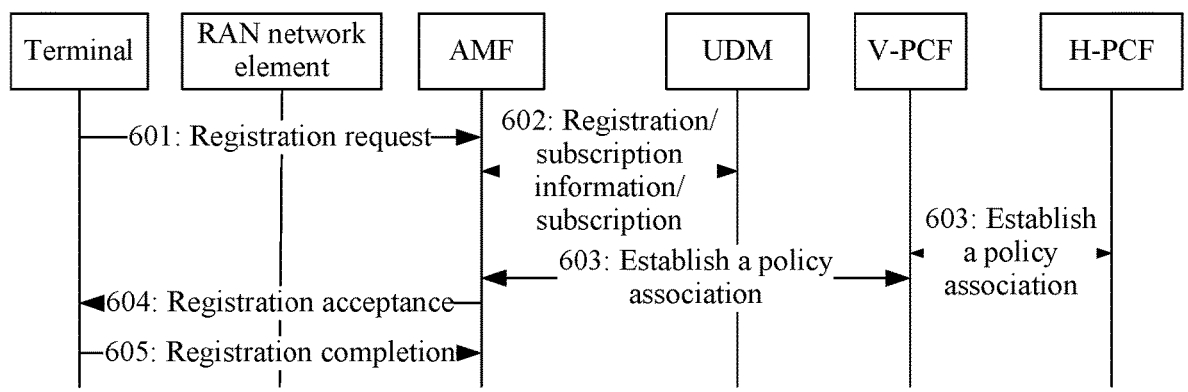
FIG. 6 is a flowchart 3 of a registration process according to an embodiment of the present disclosure.

Referring to FIG. 6, after the terminal that subscribes to the non-public communication network roams to the public communication network, the terminal may initiate a corresponding registration process, which corresponds to registration of a network of a type A. As shown in 6, the registration process may include the following steps:

Step 601: A terminal sends a registration request message to an AMF entity through a RAN network element.

Optionally, the registration request message may include first information. The first information may be described in the embodiment shown in FIG. 2. For example, the first information may include at least one of the following: access network type information, information of non-public communication network, indication information of non-public communication service, and DN container information related to a non-public communication service.

Step 602: The AMF entity performs registration with a UDM.

Optionally, the AMF entity may send the first information to the UDM. According to the first information, the UDM may determine that the terminal is registered with the non-public communication network. The UDM does not delete a context that is previously registered by the terminal with the public communication network.

Optionally, the AMF entity may obtain subscription information of the terminal from the UDM. Optionally, the UDM may send the subscription information of the non-public communication network of the terminal to the AMF entity.

Step 603: The AMF entity may select an H-PCF and a V-PCF based on the first information. The AMF and the V-PCF establish a policy association for the terminal, and the V-PCF and H-PCF establish a policy association for the terminal.

Optionally, the H-PCF may be an H-PCF in the non-public communication network.

Step 604: The AMF entity sends a registration acceptance message to the terminal through a RAN network element.

Optionally, the AMF entity may send an NG interface message to the RAN network element, where NG interface message may include the registration acceptance message. The RAN element sends an RRC message to the terminal, where the RRC message includes the registration acceptance message.

Step 605: The terminal sends a registration completion message to the AMF entity through the RAN network element.

Figure 7:
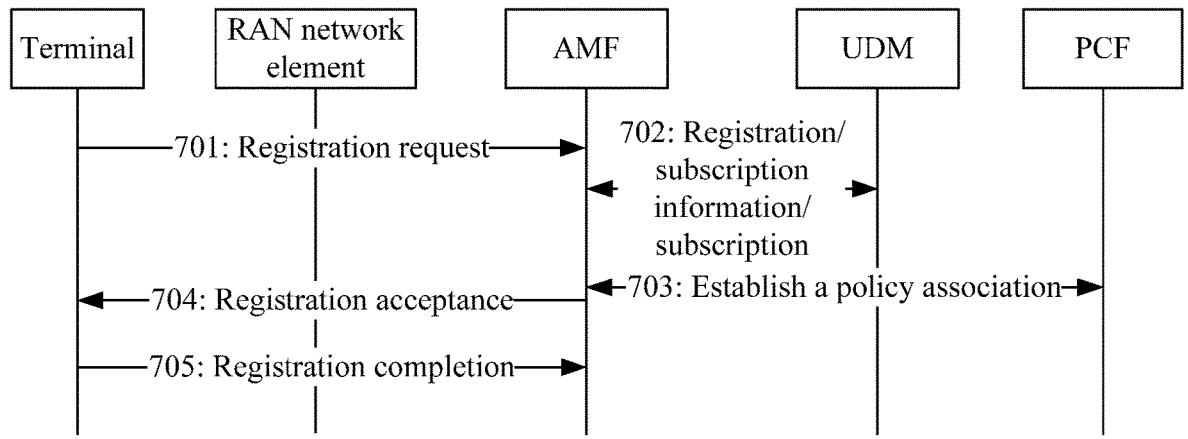
FIG. 7 is a flowchart 4 of a registration process according to an embodiment of the present disclosure.

Referring to FIG. 7, when the terminal that subscribes to the non-public communication network supports both areas of the public communication network and the non-public communication network (corresponding to the architecture 1, where the RAN network element supports both the public communication network and the non-public communication network), the terminal may initiate a corresponding registration process. After registration is completed, the type information of the registration accept may be sent to the RAN network element and the terminal. As shown in FIG. 7, the registration process may include the following steps:

Step 701: A terminal sends a registration request message to an AMF entity through a RAN network element.

Optionally, the terminal may send an RRC message to the RAN network element. The RAN network element may send an NG interface message to the AMF. The RRC message and the NG interface message include the registration request message. Optionally, the registration request message includes first information. The first information may be described in the embodiment shown in FIG. 2. For example, the first information may include at least one of the following: access network type information, information of non-public communication network, indication information of non-public communication service, and DN container information related to a non-public communication service.

Step 702: The AMF entity performs registration with a UDM.

Optionally, the AMF entity may send the first information to the UDM. According to this first information, the UDM may determine that the terminal is registered with the non-public communication network. The UDM does not delete a context that is previously registered by the terminal with the public communication network.

Optionally, the AMF entity may obtain subscription information of the terminal from the UDM. Optionally, the UDM may send the subscription information of the non-public communication network of the terminal to the AMF entity.

Step 703: The AMF entity establishes a policy association with the PCF entity for the terminal. The PCF may be a PCF in the non-public communication network.

Step 704: The AMF entity sends a registration acceptance message to the terminal through a RAN network element.

Optionally, the AMF entity may send an NG interface message to the RAN network element, where NG interface message may include the registration acceptance message. The RAN network element sends an RRC message to the terminal, where the RRC message includes the registration acceptance message.

Optionally, the registration acceptance message may include second information. The second information may be described in the embodiment shown in FIG. 3. For example, the second information may include type information of the registration accept. The type information of the registration accept may include at least one of the following: public communication network registration acceptance and non-public communication network registration acceptance.

Step 705: The terminal sends a registration completion message to the AMF through a RAN network element.

It can be understood that when a terminal that subscribes to a non-public communication network initiates registration in an area that supports both the public communication network and the non-public communication network, the RAN network element needs to know a registration acceptance type to perform a subsequent movement operation. In another implementation, the terminal requests to access to a non-public communication network A and the terminal is allowed to roam to a public communication network B, and a currently accessed cell supports both A and B. If the network A is congested, for example, the AMF entity is congested or a slice of the non-public communication network is congested, the terminal may be registered with the network B. Therefore, indicating the registration type of the terminal can help the terminal and the RAN network element determine to initiate a subsequent service. Generally, in the public communication network, a non-public communication service and a public communication service of the type A may be initiated. In the non-public communication network, the non-public communication service may be initiated.

The network access method in the present disclosure is described in the foregoing embodiment. A terminal and a network side network element in the present disclosure are described below with reference to embodiments and accompanying drawings.

Figure 8:
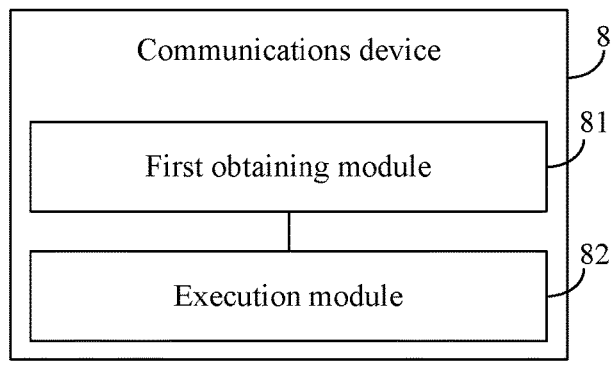
FIG. 8 is a schematic structural diagram of a communications device according to an embodiment of the present disclosure.

As shown in FIG. 8, an embodiment of the present disclosure further provides a communications device 8. The communications device may be a terminal or a network side network element, including:

a first obtaining module 81, configured to obtain certificate information related to a non-public communication network; and an execution module 82, configured to perform an operation of accessing a first network based on the certificate information related to the non-public communication network, where the first network is a network supporting a non-public communication service.

It should be noted that the certificate information related to the non-public communication network may be described in the embodiment shown in FIG. 1, for example, the certificate information related to the non-public communication network includes at least one of the following: a dedicated user identifier, dedicated security information, certificate validity time information, certificate validity area range information, information of non-public communication network, information of non-public communication service application, and dedicated access control information.

It is not difficult to understand that in this embodiment, the certificate information related to the non-public communication network is configured on each of the terminal side and the network side, and the terminal can access the network supporting the non-public communication service, to clarify how the terminal accesses each of the non-public communication network and the public communication network. In this way, the terminal securely accesses a service in the non-public network through the non-public communication network or terminals in the non-public network communicate with each other.

Figure 9:
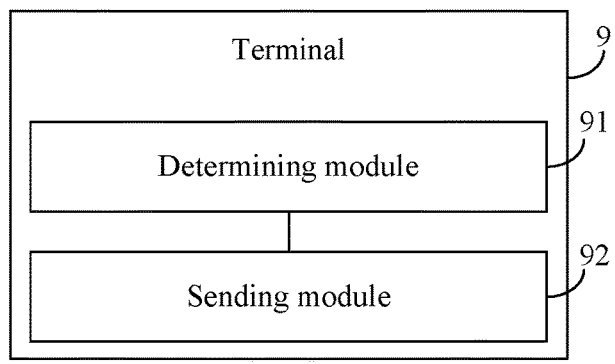
FIG. 9 is a schematic structural diagram 1 of a terminal according to an embodiment of the present disclosure.

Referring to FIG. 9, an embodiment of the present disclosure further provides a terminal 9, including:

a determining module 91, configured to determine whether a preset condition is met; and a sending module 92, configured to: when determining that the preset condition is met, send first information to a target end.

The first information may be described in the embodiment shown in FIG. 2. The first information may include at least one of the following: access network type information, information of non-public communication network, indication information of non-public communication service, and data network DN container information related to a non-public communication service.

Optionally, the preset condition includes any one of the following: accessing a non-public communication network is needed, there is currently non-public communication network's coverage, and a camped cell that indicates that a non-public communication network is supported.

It is not difficult to understand that the first information in the embodiments of the present disclosure can help the network know that the non-public communication network is currently accessed, thereby clarifying how the terminal accesses each of the non-public communication network and the public communication network.

Figure 10:
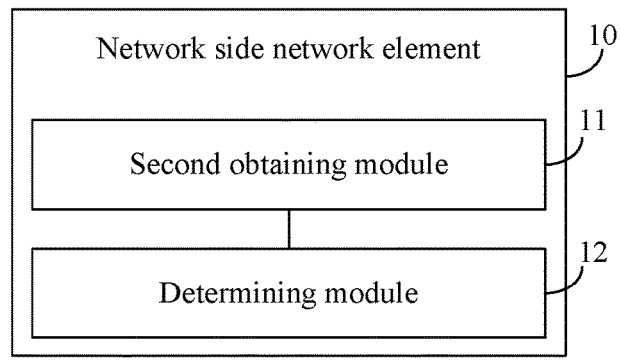
FIG. 10 is a schematic structural diagram 1 of a network side network element according to an embodiment of the present disclosure.

As shown in FIG. 10, an embodiment of the present disclosure further provides a network side network element 10, including:

a second obtaining module 11, configured to obtain first information; and a determining module 12, configured to determine a registration operation based on the first information.

The first information may be described in the embodiment shown in FIG. 2. The first information includes at least one of the following: access network type information, information of non-public communication network, indication information of non-public communication service, and DN container information related to a non-public communication service.

Optionally, the second obtaining module 11 is specifically configured to:

obtain the first information from one of the following: a terminal or terminal subscription data in a UDM entity.

Optionally, the registration operation may be described in the embodiment shown in FIG. 3. The registration operation may include any one of the following: whether to accept a registration request of a terminal, whether to establish a second context of the terminal, whether to replace a first context of the terminal, verifying the registration request by using subscription data corresponding to network type, sending second information, and whether to request a DN to verify the terminal.

Optionally, the second information may be described in the embodiment shown in FIG. 3. The second information may include any one of the following: type information of the registration accept and information of network accepting the registration.

It is not difficult to understand that the first information in the embodiments of the present disclosure can help the network know that the non-public communication network is currently accessed, thereby clarifying how the terminal accesses each of the non-public communication network and the public communication network.

An embodiment of the present disclosure further provides a communications device, including a processor, a memory, and a computer program stored on the memory and executable on the processor. When the computer program is executed by the processor, processes in the embodiments of the foregoing network access method are implemented, and a same technical effect can be achieved. To avoid repetition, details are not described again herein.

Figure 11:
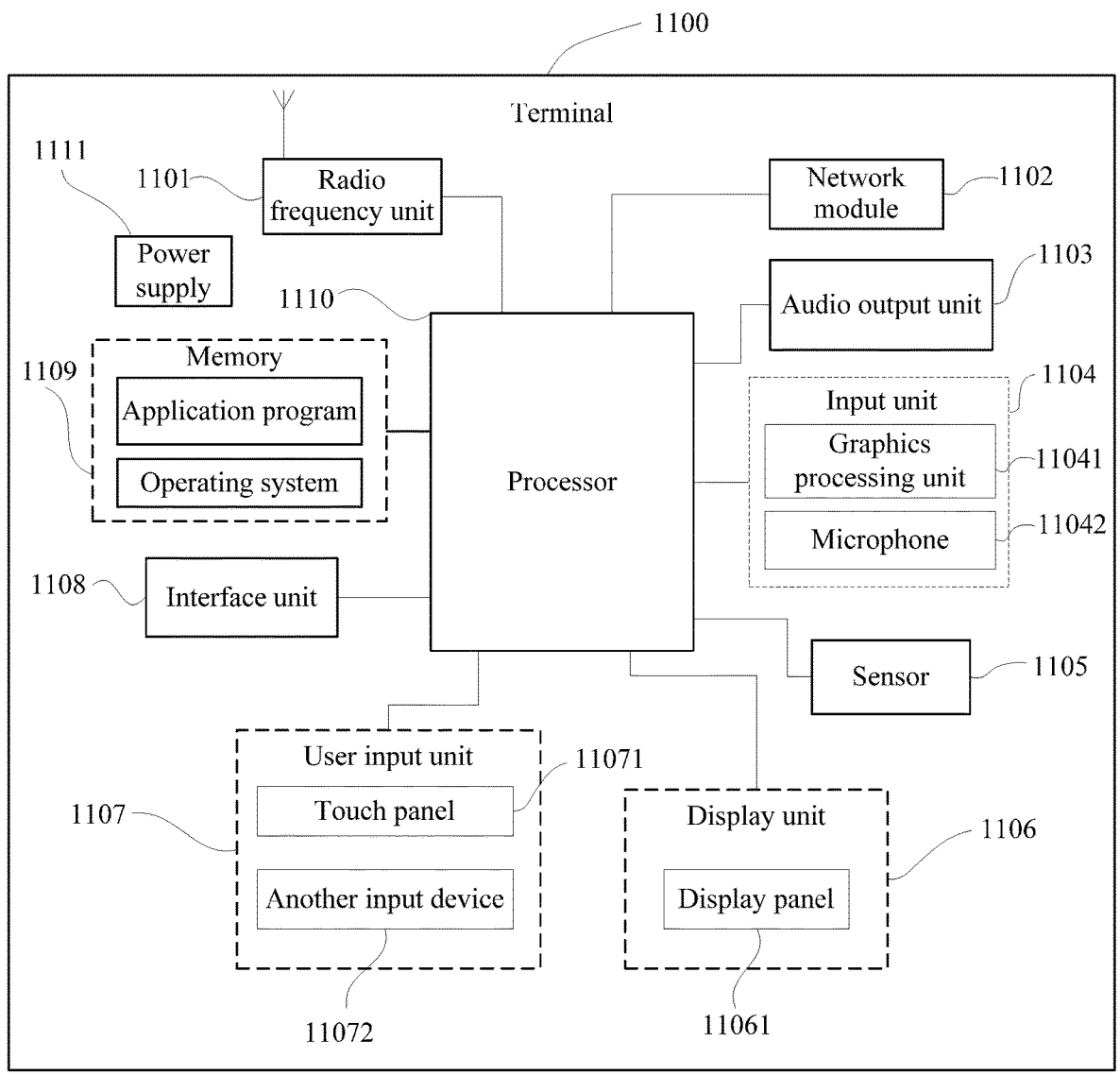
FIG. 11 is a schematic structural diagram 2 of a terminal according to an embodiment of the present disclosure.

Specifically, FIG. 11 is a schematic structural diagram of hardware of a terminal implementing embodiments of the present disclosure. The terminal 1100 includes, but is not limited to: a radio frequency unit 1101, a network module 1102, an audio output unit 1103, an input unit 1104, a sensor 1105, a display unit 1106, a user input unit 1107, an interface unit 1108, a memory 1109, a processor 1110, a power supply 1111, and other components. A person skilled in the art may understand that the structure of the terminal shown in FIG. 11 does not constitute a limitation on the terminal. The terminal may include more or fewer components than those shown in the figure, or some components may be combined, or there may be a different component arrangement. In this embodiment of the present disclosure, the terminal includes, but is not limited to, a mobile phone, a tablet computer, a notebook computer, a palmtop computer, a vehicle-mounted terminal, a wearable device, a pedometer, or the like.

The processor 1100 is configured to obtain certificate information related to a non-public communication network, and perform an operation of accessing a first network according to the certificate information related to the non-public communication network, where the first network is a network supporting a non-public communication service.

It is not difficult to understand that in this embodiment of the present disclosure, the certificate information related to the non-public communication network is configured on the terminal side, and the terminal can access the network supporting the non-public communication service, to clarify how the terminal accesses each of the non-public communication network and the public communication network. In this way, the terminal securely accesses a service in the non-public network through the non-public communication network or terminals in the non-public network communicate with each other.

Alternatively, the processor 1110 is configured to determine whether a preset condition is met.

The radio frequency unit 1101 is configured to: when it is determined that the preset condition is met, send first information to a target end, where the first information includes at least one of the following: access network type information, information of non-public communication network, indication information of non-public communication service, and data network DN container information related to a non-public communication service.

It is not difficult to understand that the first information in the embodiments of the present disclosure can help the network know that the non-public communication network is currently accessed, thereby clarifying how the terminal accesses each of the non-public communication network and the public communication network.

It should be understood that, in this embodiment of the present disclosure, the radio frequency unit 1101 can be configured to receive and transmit a signal in a process of information receiving and sending or calling. Specifically, the radio frequency unit receives downlink data from a base station, and transmits the downlink data to the processor 1110 for processing; and in addition, transmits uplink data to the base station. Generally, the radio frequency unit 1101 includes, but is not limited to, an antenna, at least one amplifier, a transceiver, a coupler, a low noise amplifier, a duplexer, and the like. In addition, the radio frequency unit 1101 may further communicate with a network and another device by using a wireless communication system.

The terminal provides a user with wireless broadband Internet access through the network module 1102, for example, helps the user send and receive emails, browse web pages, and access streaming media.

The audio output unit 1103 may convert audio data received by the radio frequency unit 1101 or the network module 1102 or stored in the memory 1109 into an audio signal, and output the audio signal as sound. Moreover, the audio output unit 1103 may further provide an audio output (for example, call signal receiving sound and message receiving sound) related to a specific function performed by the terminal 1100. The audio output unit 1103 includes a loudspeaker, a buzzer, a telephone receiver, or the like.

The input unit 1104 is configured to receive audio or video signals. The input unit 1104 may include a graphics processing unit (Graphics Processing Unit, GPU) 11041 and a microphone 11042. The graphics processing unit 11041 processes image data of a static image or a video obtained by an image capturing apparatus (such as, a camera) in a video capturing mode or an image capturing mode. A processed image frame can be displayed on the display unit 1106. The image frame processed by the graphics processing unit 11041 can be stored in the memory 1109 (or another storage medium) or sent by the radio frequency unit 1101 or the network module 1102. The microphone 11042 can receive sound and can process such sound into audio data. The processed audio data can be converted, in a telephone call mode, into a format that can be sent to a mobile communications base station by the radio frequency unit 1101 for output.

The terminal 1100 further includes at least one sensor 1105 such as a light sensor, a motion sensor, and other sensors. Specifically, the light sensor includes an ambient light sensor and a proximity sensor, where the ambient light sensor can adjust brightness of the display panel 11061 according to brightness of ambient light, and the proximity sensor can turn off the display panel 11061 and/or backlight when the terminal 1100 moves towards the ear. As a type of the motion sensor, an accelerometer sensor may detect an acceleration in each direction (generally, three axes), and detect a value and a direction of gravity when the accelerometer sensor is static, and may be configured to recognize a terminal posture (such as, switching between a landscape mode and a portrait mode, a related game, or magnetometer posture calibration) and perform a function related to vibration recognition (such as a pedometer or a knock), and the like. The sensor 1105 may further include a fingerprint sensor, a pressure sensor, an iris sensor, a molecular sensor, a gyroscope, a barometer, a hygrometer, a thermometer, and an infrared sensor. Details are not described herein again.

The display unit 1106 is configured to display information input by a user or information provided to a user. The display unit 1106 may include the display panel 11061, and the display panel 11061 may be configured in a form of a liquid crystal display (Liquid Crystal Display, LCD), an organic light-emitting diode (Organic Light-Emitting Diode, OLED), or the like.

The user input unit 1107 can be configured to receive inputted numeric or character information, and generate key signal inputs related to user settings and function control of the terminal. Specifically, the user input unit 1107 includes a touch panel 11071 and another input device 11072. The touch panel 11071, also called a touch screen, can collect a touch operation of the user on or near the touch panel 11071 (for example, an operation performed by the user with any suitable object or accessory such as a finger or a stylus on or near the touch panel 11071). The touch panel 11071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 1110, and receives and executes a command from the processor 1110. In addition, the touch panel 11071 may be implemented by using a plurality of types such as a resistive type, a capacitive type, an infrared ray, and a surface acoustic wave. In addition to the touch panel 11071, the user input unit 1107 may further include the another input device 11072. Specifically, the another input device 11072 may include, but is not limited to, a physical keyboard, function keys (such as a volume control key and an on/off key), a trackball, a mouse, and a joystick. Details are not described herein again.

Further, the touch panel 11071 may cover the display panel 11061. When the touch panel 11071 detects a touch operation on or near the touch panel 11071, the touch operation is transmitted to the processor 1110 to determine a type of a touch event, and then the processor 1110 provides corresponding visual output on the display panel 11061 according to the type of the touch event. Although in FIG. 11, the touch panel 11071 and the display panel 11061 serve as two independent components to implement input and output functions of the terminal, in some embodiments, the touch panel 11071 and the display panel 11061 can be integrated to implement the input and output functions of the terminal. Details are not limited herein.

The interface unit 1108 is an interface for connecting an external apparatus to the terminal 1100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 1108 may be configured to receive an input (for example, data information and power) from an external apparatus and transmit the received input to one or more elements within the terminal 1100, or may be configured to transmit data between the terminal 1100 and the external apparatus.

The memory 1109 may be configured to store software programs and various data. The memory 1109 may mainly include a program storage area and a data storage area. The program storage area may store an operating system, an application program required by at least one function (such as a sound playback function and an image display function), and the like. The data storage area may store data (such as audio data and a phone book) created based on use of the mobile phone, and the like. In addition, the memory 1109 may include a high-speed random access memory or a nonvolatile memory, for example, at least one magnetic disk storage device, a flash memory, or another volatile solid-state storage device.

The processor 1110 is a control center of the terminal, connects various parts of the entire terminal by using various interfaces and circuits, and performs various functions of the terminal and processes data by running or executing software programs and/or modules stored in the memory 1109 and invoking data stored in the memory 1109, so as to monitor the terminal as a whole. The processor 1110 may include one or more processing units. Optionally, the processor 1110 may be integrated with an application processor and a modem processor. The application processor mainly processes an operating system, a user interface, an application program, and the like, and the modem processor mainly processes wireless communication. It can be understood that the foregoing modem processor may not be integrated into the processor 1110.

The terminal 1100 may further include a power supply 1111 (for example, a battery) that supplies power to various components. Optionally, the power supply 1111 may be logically connected to the processor 1110 through a power supply management system, to perform functions of managing charging, discharging, and power consumption through the power supply management system.

In addition, the terminal 1100 may further include some functional modules not shown. Details are not described herein again.

Figure 12:
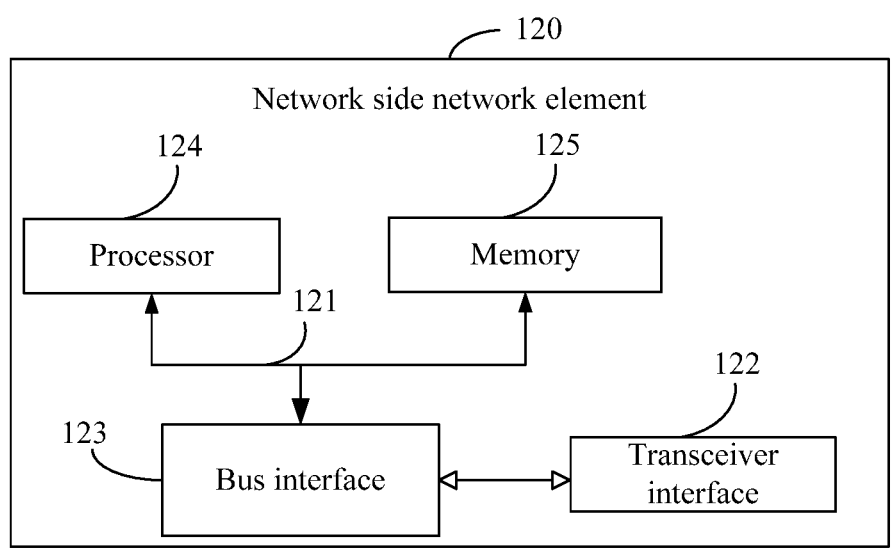
FIG. 12 is a schematic structural diagram 2 of a network side network element according to an embodiment of the present disclosure.

Specifically, FIG. 12 is a schematic diagram of a hardware structure of a network side network element for implementing various embodiments of the present disclosure. A network side network element 120 includes, but is not limited to, a bus 121, a transceiver interface 122, a bus interface 123, a processor 124, and a memory 125.

In this embodiment of the present disclosure, the network side network element 120 further includes: a computer program stored on the memory 125 and executable on the processor 124.

When the computer program is executed by the processor 124, the following steps may be implemented:

obtaining certificate information related to a non-public communication network; and performing an operation of accessing a first network based on the certificate information related to the non-public communication network, where the first network is a network supporting a non-public communication service.

Alternatively, when the computer program is executed by the processor 124, the following steps may be further implemented:

obtaining first information; and determining a registration operation based on the first information, where the first information includes at least one of the following: access network type information, information of non-public communication network, indication information of non-public communication service, and DN container information related to a non-public communication service.

The transceiver interface 122 is configured to receive and send data under control of the processor 124.

In FIG. 12, for a bus architecture (represented by the bus 121), the bus 121 may include any quantity of interconnected buses and bridges, and the bus 121 interconnects various circuits of one or more processors represented by the processor 124 and a memory represented by the memory 125. The bus 121 may further link together various other circuits, such as a peripheral device, a voltage regulator, and a power management circuit. These are all well known in the art. Therefore, this specification provides no further description. The bus interface 123 provides an interface between the bus 121 and the transceiver interface 122. The transceiver interface 122 may be one or more elements, for example, a plurality of receivers and transmitters, and provides a unit that is configured to communicate with various other apparatuses on a transmission medium.

The processor 124 is responsible for managing the bus 121 and general processing, and may further provide various functions, including timing, peripheral interfacing, voltage regulation, power management, and another control function. The memory 125 may be configured to store data used by the processor 124 when performing an operation.

Optionally, the processor 124 can be a central processing unit (Central Processing Unit, CPU), an application specific integrated circuit (Application Specific Integrated Circuit, ASIC), a field programmable gate array (Field Programmable Gate Array, FPGA), or a complex programmable logic device (Complex Programmable Logic Device, CPLD).

An embodiment of the present disclosure further provides a computer-readable storage medium, the computer-readable storage medium stores a computer program, and when the computer program is executed by a processor, processes of the embodiments of the foregoing network access method may be implemented, and a same technical effect can be achieved. To avoid repetition, details are not described herein again. The computer-readable storage medium may be a read-only memory (Read-Only Memory, ROM), a random access memory (Random Access Memory, RAM), a magnetic disk, an optical disc, or the like.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. In the absence of more limitations, an element defined by "including a . . . " does not preclude the existence of other identical elements in the process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present disclosure essentially, or the part contributing to the related technologies may be implemented in a form of a software product. The computer software product is stored in a storage medium (for example, a ROM/RAM, a magnetic disk, or an optical disc), and includes a plurality of instructions for instructing a terminal (which may be a mobile phone, a computer, a server, an air conditioner, a network side network element, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from aims of the present disclosure and the protection scope of claims, all of which fall within the protection of the present disclosure.

The invention claimed is:

1. A network access method, applied to a communications device, comprising:
   receiving certificate information related to a non-public communication network, wherein the non-public communication network is a network comprising a core network network element; and
   performing an operation of accessing a first network based on the certificate information related to the non-public communication network, wherein
   the first network is a network supporting a non-public communication service;
   wherein the certificate information related to the non-public communication network comprises a dedicated user identifier and at least one of validity time information of certificate or validity area range information of certificate;
   wherein the dedicated user identifier is a user identifier specific to the non-public communication network.

2. The method according to claim 1, wherein the certificate information related to the non-public communication network further comprises at least one of the following:
   dedicated security information, information of non-public communication network, information of non-public communication service application, or dedicated access control information.

3. The method according to claim 1, wherein the validity area range information comprises any one of the following: a tracking area TA identifier, a network element identifier of a radio access network RAN, and a cell identifier.

4. The method according to claim 2, wherein the information of non-public communication network comprises any one of the following: a non-public communication network identifier, non-public communication network type information, a public land mobile network PLMN identifier of the non-public communication network, service area information of the non-public communication network, and information of non-public communication network application.

5. A network access method, applied to a terminal side, comprising:
   determining whether a preset condition is met; and
   when determining that the preset condition is met, sending first information to a target end, wherein
   the first information comprises access network type information;

the preset condition comprises any one of the following: accessing a non-public communication network is needed, there is currently non-public communication network's coverage, and a camped cell that indicates that a non-public communication network is supported.

6. The method according to claim 5, wherein the access network type information comprises any one of the following: information of non-public communication network and information of public communication network.

7. The network access method according to claim 5, wherein
the first information further comprises at least one of the following: information of non-public communication network, indication information of non-public communication service, or data network (DN) container information related to a non-public communication service.

8. A network access method, applied to a network side, comprising:
obtaining first information; and
determining a registration operation based on the first information, wherein
the first information comprises access network type information;
wherein the registration operation comprises any one of the following: whether to accept a registration request of a terminal, whether to establish a second context of the terminal, whether to replace a first context of the terminal, verifying the registration request by using subscription data corresponding to network type, sending second information, and whether to request a DN to verify the terminal.

9. The method according to claim 8, wherein the obtaining first information comprises:
obtaining the first information from one of the following: a terminal or terminal subscription data in a unified data management UDM entity.

10. The method according to claim 8, wherein the second information comprises any one of the following: type information of the registration accept and information of network accepting the registration.

11. The network access method according to claim 8, wherein
the first information further comprises at least one of the following: information of non-public communication network, indication information of non-public communication service, or data network (DN) container information related to a non-public communication service.

12. A communications device, comprising: a memory, a processor, and a computer program stored in the memory and executable on the processor, wherein when the computer program is executed by the processor, the steps of the network access method according to claim 1 are performed.

13. The communications device according to claim 12, wherein the certificate information related to the non-public communication network further comprises at least one of the following:
dedicated security information, information of non-public communication network, information of non-public communication service application, or dedicated access control information.

14. The communications device according to claim 13, wherein the validity area range information comprises any one of the following: a tracking area TA identifier, a network element identifier of a radio access network RAN, and a cell identifier.

15. The communications device according to claim 13, wherein the information of non-public communication network comprises any one of the following: a non-public communication network identifier, non-public communication network type information, a public land mobile network PLMN identifier of the non-public communication network, service area information of the non-public communication network, and information of non-public communication network application.

16. A communications device, comprising: a memory, a processor, and a computer program stored in the memory and executable on the processor, wherein when the computer program is executed by the processor, the steps of the network access method according to claim 5 are performed.

17. A communications device, comprising: a memory, a processor, and a computer program stored in the memory and executable on the processor, wherein when the computer program is executed by the processor, the steps of the network access method according to claim 8 are performed.

18. A non-transitory computer-readable storage medium, wherein the non-transitory computer-readable storage medium stores a computer program, and when the computer program is executed by a processor, the steps of the network access method according to claim 1 are performed.

19. A non-transitory computer-readable storage medium, wherein the non-transitory computer-readable storage medium stores a computer program, and when the computer program is executed by a processor, the steps of the network access method according to claim 5 are performed.

20. A non-transitory computer-readable storage medium, wherein the non-transitory computer-readable storage medium stores a computer program, and when the computer program is executed by a processor, the steps of the network access method according to claim 8 are performed.

* * * * *